US009386019B1

(12) United States Patent
Barak et al.

(10) Patent No.: US 9,386,019 B1
(45) Date of Patent: Jul. 5, 2016

(54) SYSTEM AND METHOD FOR CONTROLLED ACCESS TO NETWORK DEVICES

(71) Applicants: Nir Barak, Karmi Yosef (IL); Itzhak Fadida, Haifa (IL); Amir Jerbi, Givatayim (IL); Azy Shalom, Tel-Aviv (IL)

(72) Inventors: Nir Barak, Karmi Yosef (IL); Itzhak Fadida, Haifa (IL); Amir Jerbi, Givatayim (IL); Azy Shalom, Tel-Aviv (IL)

(73) Assignee: CA, Inc., New York, NY (US)

(*) Notice: Subject to any disclaimer, the term of this patent is extended or adjusted under 35 U.S.C. 154(b) by 321 days.

(21) Appl. No.: 13/828,763

(22) Filed: Mar. 14, 2013

(51) Int. Cl.
*G06F 21/00* (2013.01)
*H04L 29/06* (2006.01)

(52) U.S. Cl.
CPC ..................... *H04L 63/10* (2013.01)

(58) Field of Classification Search
CPC .......... G06F 17/30867; G06F 17/3092; G06F 21/10; G06F 21/6218; H04L 63/20; H04L 63/105

USPC .......................................................... 726/1–6
See application file for complete search history.

(56) References Cited

U.S. PATENT DOCUMENTS

| 2006/0069668 | A1* | 3/2006 | Braddy et al. ..................... 707/2 |
| 2010/0180328 | A1* | 7/2010 | Moas et al. ........................ 726/6 |
| 2012/0198512 | A1* | 8/2012 | Zhou et al. ........................ 726/1 |

* cited by examiner

*Primary Examiner* — Amir Mehrmanesh
(74) *Attorney, Agent, or Firm* — Baker Botts L.L.P.

(57) ABSTRACT

In one embodiment, a system includes a non-transitory computer readable medium comprising one or more rules associated with access to a first server. The system further includes a processor configured to receive, a first request from a client to access a first server, the first request comprising first access information associated with a user of the client. The processor is further configured to determine, based on the one or more rules and the first access information, that the client may access the first server and retrieve second access information associated with the first server in response to determining that the client may access the first server. The processor is also configured to receive data from the first server using the retrieved second access information and the first request and send the data from the first server to the client using the one or more rules.

14 Claims, 4 Drawing Sheets

SYSTEM AND METHOD FOR CONTROLLED ACCESS TO NETWORK DEVICES

BACKGROUND

Currently, in order to allow secure access to network servers by clients, network administrators must either install an agent on each of the network servers or use a proxy server on the network to inspect packets traversing between the clients and network servers. In systems that use agents installed on the network servers, the agent may control what commands can be issued or run on the server by the client or otherwise audit the activity on the server. However, installing an agent on each of the network servers is not always possible or practicable in the enterprise context due to the time required to develop and install separate agents on each server. Using a proxy, on the other hand, requires changing network topology in order to accommodate the proxy. In addition, the proxy may be very sensitive to network protocol changes that may occur later on.

BRIEF SUMMARY

In one embodiment, a system includes a non-transitory computer readable medium comprising one or more rules associated with access to a first server. The system further includes a processor configured to receive, a first request from a client to access a first server, the first request comprising first access information associated with a user of the client. The processor is further configured to determine, based on the one or more rules and the first access information, that the client may access the first server and retrieve second access information associated with the first server in response to determining that the client may access the first server. The processor is also configured to receive data from the first server using the retrieved second access information and the first request and send the data from the first server to the client using the one or more rules.

According to certain embodiments of the present disclosure, the processor may be further configured to receive a command from the client to be run on the first server and determine, based on the one or more rules, whether the client may run the command on the first server. The processor may be further configured to generate, in response to determining that the client may not run the command on the first server, an alert to the client indicating that the command may not be run on the first server.

According to certain embodiments of the present disclosure, the processor may be further configured to receive a second request from the client to access a directory on the first server and determine, based on the one or more rules, whether the client may access the directory on the first server. The processor may be further configured to generate, in response to determining that the client may not access the directory on the first server, an alert to the client indicating that the directory may not be accessed on the first server.

According to certain embodiments of the present disclosure, the processor may be further configured to receive one or more commands from the client to be run on the first server, receive, in response to the one or more commands, output information from the first server, and store the one or more commands and the output information. In some embodiments, the one or more commands and the output information may be stored at a second server.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
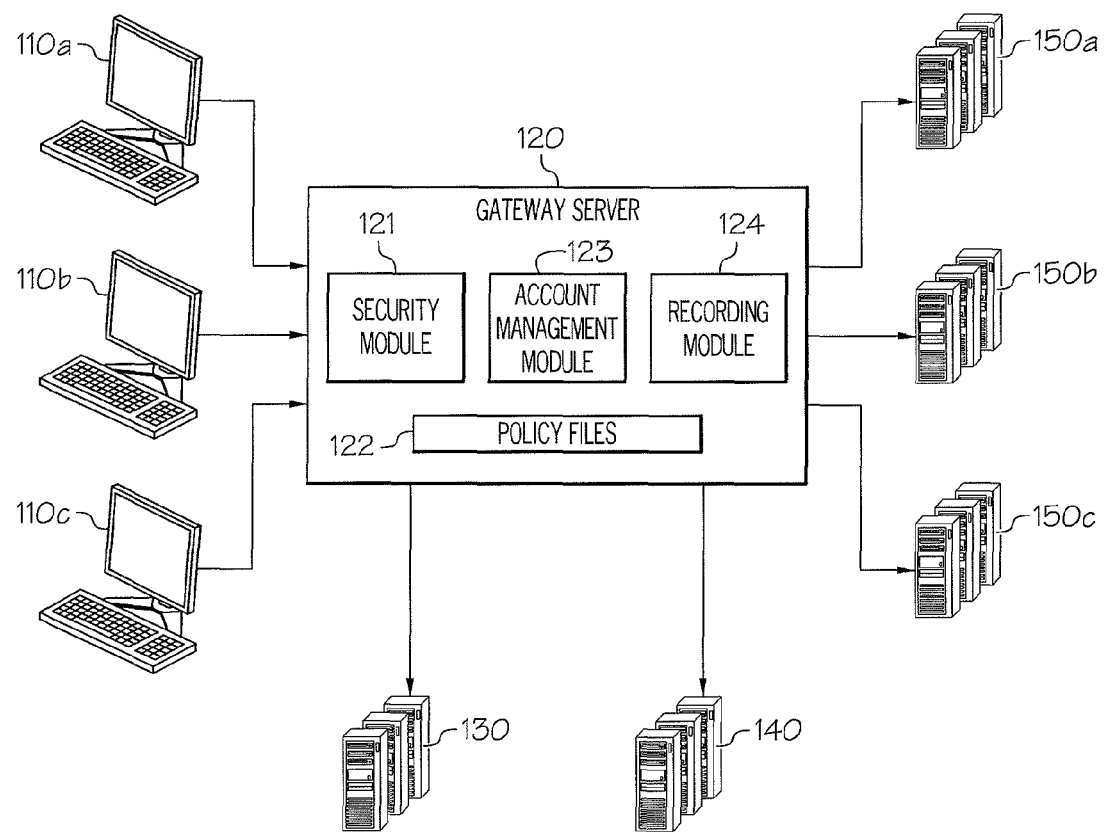
FIG. 1 illustrates a system that includes that includes clients, a gateway server, an account management server, a recording server, and network servers in accordance with particular embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or by combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates a system that includes clients 110, a gateway server 120, an account management server 130, a recording server 140, and network servers 150. Currently, in order to allow secure access to network servers 150 by clients 130, network administrators must either install an agent on each of the network servers 150 or use a proxy server on the network to inspect packets traversing between the clients 130 and network servers 150. In systems that use agents installed on the network servers 150, the agent may control what commands can be issued or run on the server by the client or otherwise audit the activity on the server. However, installing an agent on each of the network servers 150 is not always possible or practicable in the enterprise context due to the time required to develop and install separate agents on each server. Using a proxy, on the other hand, requires changing network topology in order to accommodate the proxy. In addition, the proxy may be very sensitive to network protocol changes that may occur later on.

Accordingly, in particular embodiments of the present disclosure, a gateway server (e.g., gateway server 120 of FIG. 1) may be used to control, audit, and/or record client access to servers on a network. This may be accomplished by forcing clients (e.g., clients 110) to connect to the servers (e.g., network servers 150) through a security module located on the gateway. For instance, in some embodiments, a user at a client 110 may not be able to login to the network server 150, since the credentials for network server 150 would be managed by and only accessible via gateway server 120. The user may thus be required to first login to gateway server 120 in order to access the credentials for the network sever 150 for which he is attempting to access. In some embodiments, the credentials to network server 150 may not actually be shared with the user in order to maintain security of network servers 150 by requiring that the user connect to network server 150 through gateway server 120. In addition, the gateway may be able to control what servers may be accessed by a client, control what commands may be issued at the servers by the client, and record client interactions with the servers. For instance, gateway server 120 may be operable, with the use of certain policy files, to allow or deny access to certain servers by a client, certain directories on a server that the client may access, This may all be accomplished without requiring the use of an agent installed on each server and without the sensitivity and extra configuration that is associated with using a network proxy that inspects packets going between the clients and the servers.

For instance, referring to FIG. 1, gateway server 120 may include a security module 121, policy files 122, an account management module 123, and a recording module 124. In particular embodiments, clients 110 may access servers 150 through security module 121 on gateway server 120. For example, a user of client 110 may first connect to gateway server 120. This may be done, for example, through a remote shell interface such as Secure Shell (SSH) protocol or Windows Remote Desktop. In order to connect to network servers 150, the user may then access security module 121 on gateway server 120, which may be, for example, a secured client installed on gateway server 120. Gateway server 120 may be secured, in some embodiments, in order to prevent users from installing unsecured clients or remote access interfaces for gaining full access to network servers 150. In some embodiments, security module 121 installed on gateway server 120 may be a secured version of PuTTY. Gateway server 120 and security module 121 may also be hardened and secured such that it may prevent users from modifying it in order to access areas or commands on network servers 150 for which the user is not authorized. In particular embodiments, clients 110 may be forced to access network servers 150 through gateway server 120 through certain network controls (e.g., a firewall). Accordingly, users of clients 110 may only be able to access network servers 150 through security module 121 on gateway server 120.

In certain embodiments, security module may control access to network servers 150 using policy files 122 at gateway server. For example, security module 121 may use policy files 122 to control what commands are allowed to be run or sent to network servers 150. In addition, security module 121 may use policy files 122 to control what data may be accessed by clients 110, or what may be sent or received by client 110. In some embodiments, policy files 122 may be generic to the server 150 being accessed. For example, a certain server may only have one policy file associated with it, with all clients utilizing the same policy file to access the server. Thus, each user may have the same privileges on the server being accessed. In other embodiments, policy files may be specific to the user accessing the server. For example, the policy files 122 may be customized for each particular user, with the user being able to access certain commands or directories based on his or her authorization level. In some embodiments, a user may have a single policy file that lists every server to which the user has access. This policy file may be consulted in such embodiments to determine whether a user has access to a particular server 150. In other embodiments, each user may have a separate policy file 122 for each server 150 to which he or she has access. In certain embodiments, security module 121 may access a user's policy file 122 only after he or she has input user credentials such as a username and/or password. In certain embodiments, output from network servers 150 sent to clients 110 during a session may be filtered. For example, issuing a "ps" command at a server may only show information on processes running for the user issuing the command, but not processes of the root or administrative user of the server. In some embodiments, this filtering may be performed according to information in policy files 122.

In some embodiments, users may not be directly exposed to the password or credentials to access network servers 150. Rather, security module may gather such credentials though account management module 123 by accessing and retrieving the credentials from account management server 130. For instance, account management server 130 may comprise an account password management system which may be used to retrieve account passwords and other credentials for accessing network servers 150. Accordingly, authentication for network servers 150 will be automated without exposing an account password to the user of client 110. In some embodiments, gateway server 120 may be operable to change the credentials on one or more network servers 150 in order to prevent users from directly accessing the servers 150. In such embodiments, gateway server 120 may access the network servers 150 with the new credentials without sharing the new credentials with any users of clients 110. Further, in some embodiments, aspects of the interaction between client 110 and network servers 150 may be recorded by recording module 124 in gateway server 120. The recordings may then be stored at recording server 140. The recordings may be of any suitable form, and may include, for example, video recording or text-based recording. As one example, recording module 124 may record each command entered by client 110 and each output that network server 150 provides to client 110 as text in a stored recording file.

Although depicted as separate servers, gateway server 120, it will be understood that account management server 130, and recording server 140 may reside on any number of physical (e.g., one or more of computing device 410 of FIG. 4) or virtual computing devices. For example, each of servers 120, 130, and 140 may reside on a single computing device (i.e., gateway server 120 on one computing device, account management server 130 on another computing device, and recording server 140 on yet another computing device). As another example, each of severs 120, 130, and 140 may reside and run on multiple computing devices as well. Furthermore, in some embodiments, each of severs 120, 130, and 140 may reside on one or more physical computing devices as software modules. In other embodiments, each of severs 120, 130, and 140 may reside on one or more physical computing devices as separate virtual machines.

Figure 2:
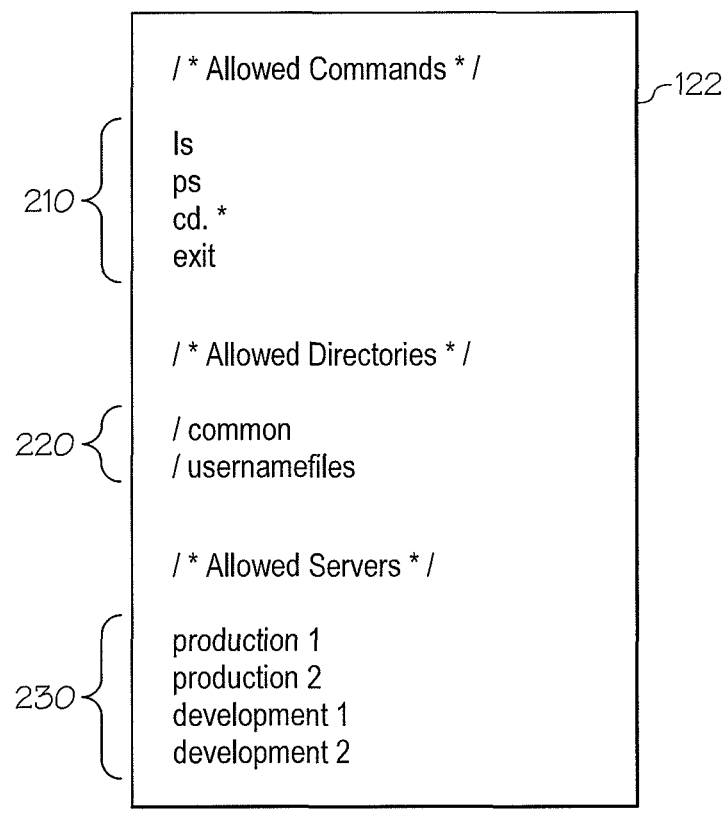
FIG. 2 illustrates an example policy file used by the gateway server of FIG. 1 in accordance with particular embodiments of the present disclosure.

FIG. 2 illustrates an example policy file used by the gateway server of FIG. 1 in accordance with particular embodiments of the present disclosure. As shown, the policy files 122 at gateway server 120 may comprise one or more rules that dictate how a user may access customer severs 150. In some embodiments, policy files 122 may include a list of allowed commands 210 that a client 110 is allowed to run on one or more servers 150. For example, a user may only be allowed to run read-only type commands at a server 150 (e.g., "ls" to list files, "ps" to display process statuses, "cd" to change directories, and "exit" to exit the session with server 150). Other users may be allowed to run only certain write type commands (e.g., "mv" to move a file or "cp" for copying a file), but may not be able to run delete or remove type commands (e.g., "rm" to remove a file). Other users, such as administrators, may be able to run any available command. In some embodiments, policy files 122 may include a list of allowed directories 220 that a client 110 may access on one or more servers 150. For example, a user associated with the policy file 122 shown in FIG. 2 may only have access to a common directory on the server (i.e., "/common") and a directory associated specifically with the user (i.e., "/usernamefiles"). Further, in some embodiments, policy files 122 may include a list of allowed servers 230 to which a user has access. For example, as shown in FIG. 2, the user associated with policy file 122 may only access servers named "production1," "production2," "development1," and "development2," but not "production3" and development3" (not shown). These policies are merely examples of policies that may be included in policy files 122, and it will be understood that any suitable policies associated with users of servers 150 may by included in policy files 122.

Figure 3:
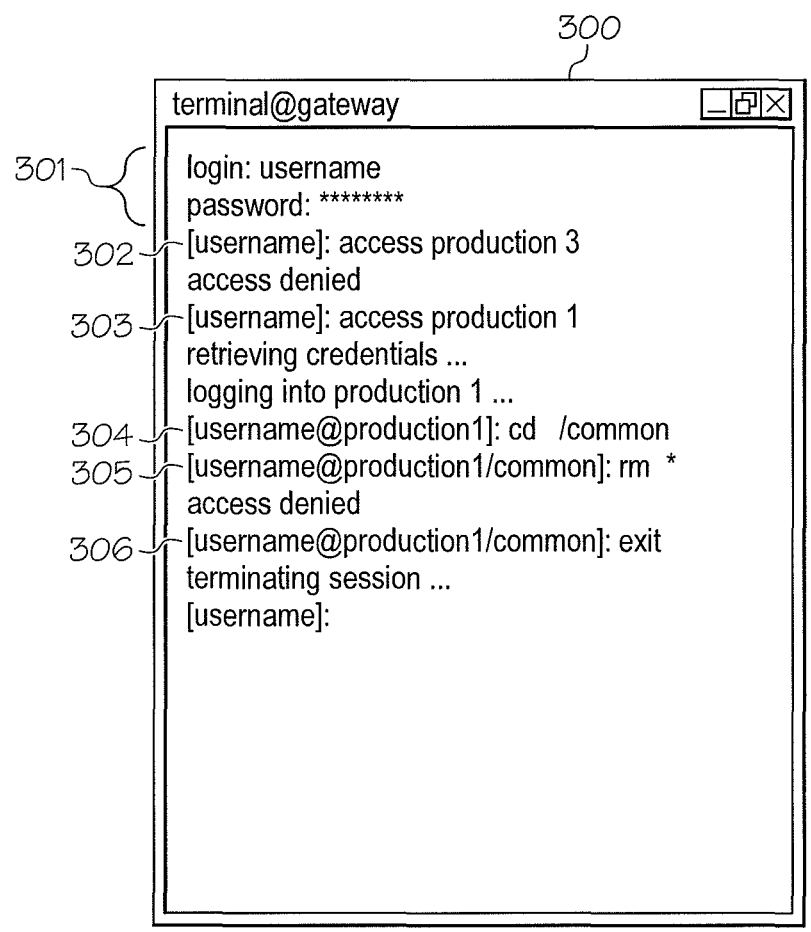
FIG. 3 illustrates an example session facilitated by the gateway server of FIG. 1 in accordance with particular embodiments of the present disclosure.

FIG. 3 illustrates an example session facilitated by the gateway server of FIG. 1 in accordance with particular embodiments of the present disclosure. The session may be initiated through a terminal 300 on gateway 120 using, for example, an SSH client. For instance, the session may be initiated by a user of a client 110 (i.e., "username") attempting to access a server 150 ("production1") through gateway server 120. The terminal 300 may run on gateway server 120 by accessing policy files 122 associated with the user of client 110. In addition, the terminal 300 may be operable to retrieve access credentials for network servers 150 from account management server 130 and/or may record one or more aspects of the session at recording server 140.

A user may first login to gateway server 120 by entering his or her user information, such as a username and password as shown at 301 in FIG. 3. Once the user has accessed gateway server 120, they may attempt to access one or more network servers 150 through gateway server 120. For example, referring to FIG. 3, a user may attempt to access servers named "production1" and "production3." To determine whether the user has access to these servers, gateway server 120 may access a policy file 122 such as the one shown in FIG. 2. Since the policy file 122 of FIG. 2 does not list "production3" as an allowed server that username may access, the command 302 to access the server is denied. However, because the policy file 122 of FIG. 2 lists "production1" as an allowed server, the command 303 to access the server is allowed. In particular embodiments, to access a server gateway server 120 may retrieve the access credentials for the accessed servers from account management server 130 and may access the servers without providing the credentials to the user. Referring to FIG. 3, this is shown by the output from gateway server 120 indicating that it is "retrieving credentials" and "logging into production1."

Once a server is accessed by a user, the user may interact with the server through one or more interactions just as if the user had accessed the server directly and without the use of gateway server 120. In particular embodiments, these interactions may be controlled, however, by policy files 122 residing at gateway server 120. For example, a user may only run certain commands or access certain directories at an accessed server as shown at commands 304-306 of FIG. 3. For instance, referring to command 304, gateway server 120 may access policy file 122 of FIG. 2 and determine both that the user is allowed to run the command "cd" and that the may access the directory "/common." Referring to command 305, gateway server 120 may access policy file 122 of FIG. 2 and determine that the user is not allowed to run the command "rm." Finally, referring to command 306, gateway server 120 may access policy file 122 of FIG. 2 and determine that the user is allowed to run the command "exit" at the server. One or more aspects of the session at terminal 300 may be recorded by gateway server 120 at recording server 140. For example, each command entered and output generated from terminal 300 may be recorded at recording server 140. As another example, only the commands entered may be recorded at recording server 140. For remote desktop access interfaces (as opposed to command line interfaces), pictures at periodic times through the session and/or a video of the session may be recorded at recording server 140.

Figure 4:
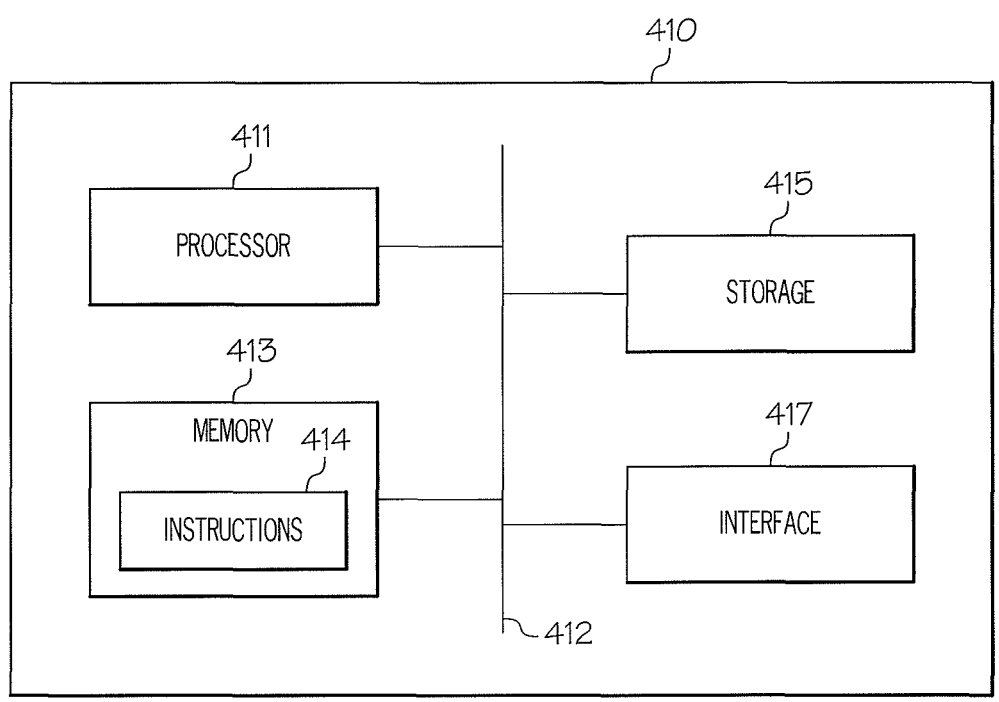
FIG. 4 illustrates a block diagram of a computer that may be used in accordance with particular embodiments of the present disclosure.

FIG. 4 illustrates a block diagram of a computer 410 that may be used in system 100 of FIG. 1 in accordance with particular embodiments. For instance, in particular embodiments, one or more computers 410 may be incorporated in application repository 110, computing devices 140 and 150, and/or configuration server 160 of FIG. 1. Each computer 410 may include its own respective processor 411, memory 413, instructions 414, storage 415, interface 417, and bus 412. These components may work together to perform one or more steps of one or more methods and provide the functionality described herein. For example, in particular embodiments, instructions 414 in memory 413 may be executed on processor 411 in order to perform one or more methods (e.g. the method of FIG. 3) using information received by interface 417. In certain embodiments, instructions 414 may reside in storage 415 instead of, or in addition to, memory 413.

Processor 411 may be a microprocessor, controller, application specific integrated circuit (ASIC), or any other suitable computing device operable to provide, either alone or in conjunction with other components (e.g., memory 413 and instructions 414) IT infrastructure monitoring functionality. Such functionality may include providing a ranking of the most troublesome or unreliable components of an IT infrastructure, as discussed herein. In particular embodiments, processor 411 may include hardware for executing instructions 414, such as those making up a computer program or application. As an example and not by way of limitation, to execute instructions 414, processor 411 may retrieve (or fetch) instructions 414 from an internal register, an internal cache, memory 413 or storage 415; decode and execute them; and then write one or more results to an internal register, an internal cache, memory 413, or storage 415.

Memory 413 may be any form of volatile or non-volatile memory including, without limitation, magnetic media, optical media, random access memory (RAM), read-only memory (ROM), flash memory, removable media, or any other suitable local or remote memory component or components. Memory 413 may store any suitable data or information utilized by computer 410, including software (e.g., instructions 414) embedded in a computer readable medium, and/or encoded logic incorporated in hardware or otherwise stored (e.g., firmware). In particular embodiments, memory 413 may include main memory for storing instructions 414 for processor 411 to execute or data for processor 411 to operate on. In particular embodiments, one or more memory management units (MMUs) may reside between processor 411 and memory 413 and facilitate accesses to memory 413 requested by processor 411.

Storage 415 may include mass storage for data or instructions (e.g., instructions 414). As an example and not by way of limitation, storage 415 may include a hard disk drive (HDD), a floppy disk drive, flash memory, an optical disc, a magneto-optical disc, magnetic tape, a Universal Serial Bus (USB) drive, a combination of two or more of these, or any suitable computer readable medium. Storage 415 may include removable or non-removable (or fixed) media, where appropriate. Storage 415 may be internal or external to computer 410 (and/or remote transceiver 220), where appropriate. In some embodiments, instructions 414 may be encoded in storage 415 in addition to, in lieu of, memory 413.

Interface 417 may include hardware, encoded software, or both providing one or more interfaces for communication (such as, for example, packet-based communication) between computer 410 and any other computer systems on network 110. As an example, and not by way of limitation, interface 417 may include a network interface controller (NIC) or network adapter for communicating with an Ethernet or other wire-based network and/or a wireless NIC (WNIC) or wireless adapter for communicating with a wireless network. Interface 417 may include one or more connectors for communicating traffic (e.g., IP packets) via a bridge card. Depending on the embodiment, interface 417 may be any type of interface suitable for any type of network in which computer 410 is used. In some embodiments, interface 417 may include one or more interfaces for one or more I/O devices. One or more of these I/O devices may enable communication between a person and computer 410. As an example, and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these.

Bus 412 may include any combination of hardware, software embedded in a computer readable medium, and/or encoded logic incorporated in hardware or otherwise stored (e.g., firmware) to couple components of computer 410 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 412 may include any number, type, and/or configuration of buses 412, where appropriate. In particular embodiments, one or more buses 412 (which may each include an address bus and a data bus) may couple processor 411 to memory 413. Bus 412 may include one or more memory buses.

The flowchart and block diagrams in FIGS. 1-4 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed:

1. A system, comprising:
   a non-transitory computer readable medium comprising one or more rules associated with access to a first server;
   a processor configured to:
   receive, a first request from a client to access the first server, the first request comprising first access information associated with a user of the client, the first access information including a first username and first password;
   authenticating the user to access a second server using the first username and first password;
   determine, based on the one or more rules and the first access information, that the client may access the first server;
   retrieve second access information associated with the first server in response to determining that the client may access the first server, the second access information being different from the first access information, the second access information not being sent to the client, the second access information including a second password associated with the user;
   authenticating the second server to access the first server using the second password;
   receive data from the first server using the retrieved second access information and the first request;
   send the data from the first server to the client using the one or more rules;
   wherein the second access information includes credentials operable to access the first server and the first access information includes credentials operable to access the second server but not operable to access the first server;
   receive one or more commands from the client to be run on the first server;
   receive, in response to the one or more commands, output information from the first server; and
   store the one or more commands and the output information at a third server.

2. The system of claim 1, wherein the processor is further configured to:
   receive a command from the client to be run on the first server;
   determine, based on the one or more rules, whether the client may run the command on the first server; and
   generate, in response to determining that the client may not run the command on the first server, an alert to the client indicating that the command may not be run on the first server.

3. The system of claim 1, wherein the processor is further configured to:
   receive a second request from the client to access a directory on the first server;
   determine, based on the one or more rules, whether the client may access the directory on the first server; and
   generate, in response to determining that the client may not access the directory on the first server, an alert to the client indicating that the directory may not be accessed on the first server.

4. The system of claim 1, wherein the second access information is retrieved from a fourth server.

5. The system of claim 1, wherein the computer readable medium further comprises a module configured to receive the first request from the client, receive the data from the first server using the retrieved second access information and the first request, and send the data from the first server to the client using the one or more rules, and wherein the module is configured to not allow modification by the client.

6. A method, comprising:
   receiving, at a first server, a first request from a client to access a second server, the first request comprising first access information associated with a user of the client, the first access information including a first username and first password;
   authenticating the user to access the first server using the first username and first password;
   determining, at the first server based on one or more rules associated with accessing the second server and the first access information, that the client may access the second server;
   retrieving second access information associated with the second server in response to determining that the client may access the second server, the second access information being different from the first access information, the second access information not being sent to the client, the second access information including a second password associated with the user;
   authenticating the first server to access the second server using the second password;
   receiving, at the first server, data from the second server using the retrieved second access information and the first request;
   sending, through the first server, the data from the second server to the client using the one or more rules; wherein the second access information includes credentials operable to access the second server and the first access information includes credentials operable to access the first server but not operable to access the second server;

receiving, at the first server, one or more commands from the client to be run on the second server;

receiving, in response to the one or more commands, output information from the second server; and storing the one or more commands and the output information at a third server.

7. The method of claim 6, further comprising:

receiving, at the first server, a command from the client to be run on the second server;

determining, based on the one or more rules, that the client may not run the command on the second server; and generating an alert to the client indicating that the command may not be run on the second server.

8. The method of claim 6, further comprising:

receiving, at the first server, a second request from the client to access a directory on the second server;

determining, based on the one or more rules, that the client may not access the directory on the second server; and generating an alert to the client indicating that the directory may not be accessed on the second server.

9. The method of claim 6, wherein the second access information is retrieved from a fourth server.

10. The method of claim 6, wherein the first server comprises a module configured to receive the first request from the client, receive the data from the first server using the retrieved second access information and the first request, and send the data from the first server to the client using the one or more rules, and wherein the module is configured to not allow modification by the client.

11. A computer program product comprising a non-transitory computer readable storage medium having computer readable program code embodied therewith, the computer readable program code comprising:

computer readable program code configured to receive a first request from a client to access a first server, the first request comprising first access information associated with a user of the client, the first access information including a first username and first password;

computer readable program code configured to authenticate the user to access a second server using the first username and first password;

computer readable program code configured to determine, based on the one or more rules associated with access to the first server and the first access information, that the client may access the first server;

computer readable program code configured to retrieve, from a third server that is separate from the first server, second access information associated with the first server in response to determining that the client may access the first server, the second access information being different from the first access information, the second access information not being sent from the client and wherein the second access information is not exposed to the client and a user of the client cannot ascertain the second access information, the second access information including a second password associated with the user;

computer readable program code configured to authenticate the second server to access the first server using the second password;

computer readable program code configured to receive data from the first server using the retrieved second access information and the first request;

computer readable program code configured to send the data from the first server to the client using the one or more rules;

wherein the second access information includes credentials operable to access the first server and the first access information includes credentials operable to access the second server but not operable to access the second server;

computer readable program code configured to receive one or more commands from the client to be run on the first server;

computer readable program code configured to receive, in response to the one or more commands, output information from the first server; and computer readable program code configured to store the one or more commands and the output information at a third server.

12. The computer program product of claim 11, wherein the computer readable program code further comprises:

computer readable program code configured to receive a command from the client to be run on the first server;

computer readable program code configured to determine, based on the one or more rules, whether the client may run the command on the first server; and computer readable program code configured to generate, in response to determining that the client may not run the command on the first server, an alert to the client indicating that the command may not be run on the first server.

13. The computer program product of claim 11, wherein the computer readable program code further comprises:

computer readable program code configured to receive a second request from the client to access a directory on the first server;

computer readable program code configured to determine, based on the one or more rules, whether the client may access the directory on the first server; and computer readable program code configured to generate, in response to determining that the client may not access the directory on the first server, an alert to the client indicating that the directory may not be accessed on the first server.

14. The computer program product of claim 11, wherein the computer readable program code is configured to not allow modification by the client.

* * * * *